UNITED STATES PATENT OFFICE.

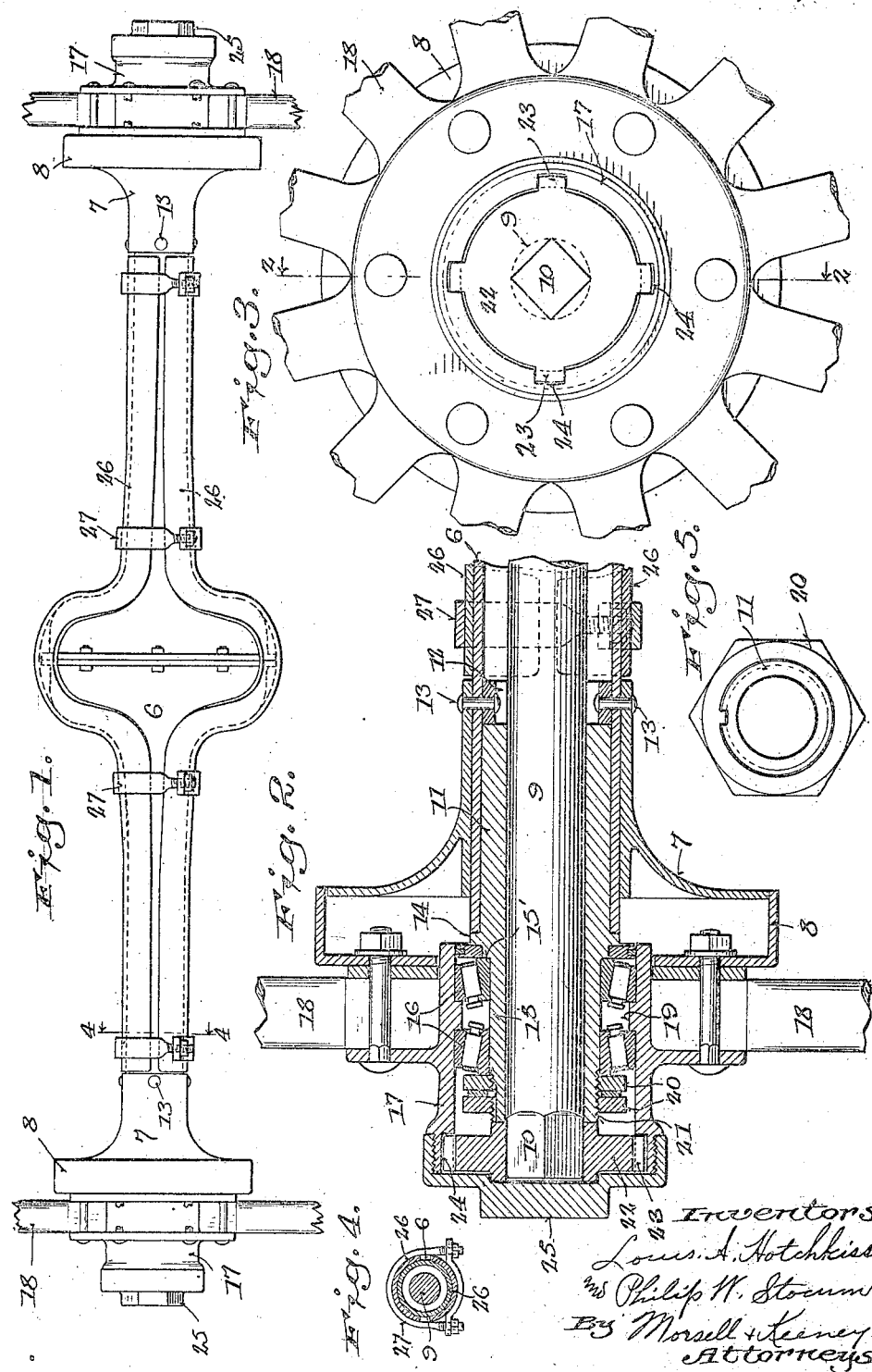

LOUIS A. HOTCHKISS AND PHILIP W. STOCUM, OF OSHKOSH, WISCONSIN; SAID STOCUM ASSIGNOR TO A. E. HOTCHKISS, OF OSHKOSH, WISCONSIN.

AXLE CONSTRUCTION.

1,377,685.      Specification of Letters Patent.      Patented May 10, 1921.

Application filed April 15, 1919. Serial No. 290,163.

*To all whom it may concern:*

Be it known that we, LOUIS A. HOTCHKISS and PHILIP W. STOCUM, citizens of the United States, and residents of Oshkosh, in the county of Winnebago and State of Wisconsin, have invented new and useful Improvements in Axle Constructions, of which the following is a description, reference being had to the accompanying drawings, which are a part of this specification.

The present invention relates to certain new and useful improvements in automobile rear axle constructions, and has for its primary object to eliminate direct bearing support on the rear drive axle.

A further object of this invention is to provide a supplemental casing engageable with the rear axle housing to reinforce the same and receive a portion of the stress placed upon the axle housing by the supporting wheel.

Another object of the present invention is to provide a means of the character stated which will be capable of use with the type of machines now in use, without any radical change in their structure.

With the above and other objects in view, our invention resides in the novel construction, combination and arrangement of parts substantially as hereinafter described, and more particularly defined by the appended claims, it being understood that such changes in the precise embodiment of the hereindisclosed invention may be made as come within the scope of the claims.

In the accompanying drawings we have illustrated one complete example of the physical embodiment of our invention constructed according to the best mode we have so far devised for the practical application of the principles thereof, in which:

Figure 1 is a plan view of a rear axle construction embodying our invention, parts thereof being broken away and in section;

Fig. 2 is a sectional view taken through one end of the rear end construction on the line 2—2 of Fig. 3;

Fig. 3 is an end view of the hub portion of our construction, the hub cap being removed;

Fig. 4 is a sectional view taken on the line 4—4 of Fig. 1, and

Fig. 5 is a plan view of the form of lock nut used in retaining the roller bearings and the drive wheel on the reinforcing sleeve.

Referring now more particularly to the drawing, the numeral 6 designates a rear axle housing having secured to each end thereof a brake mechanism carrying member 7 engageable with a brake drum 8 carried by the drive wheel, all of which is of conventional construction. The present invention is especially adapted for use with rear axle constructions of the type used on Ford cars, in which the drive axles are journaled in the rear axle housing and bears the entire weight of the car.

With such a rear axle construction, the old type of drive axle is replaced by an axle 9, having its end 10 projected outwardly of the adjacent end of the housing 6, and the outer end of a sleeve 11 partly located within the adjacent end of the housing and secured therein by any suitable means.

The sleeve 11 is positioned in the housing 6 by means of a retaining ring 12 secured in the housing by rivets 13 and an annular rib 14 formed on the sleeve and abutting the outer edge of the housing. The projected end of the sleeve 11 is reduced as at 15, thus providing a support for the pair of bearing members 16 of any desired type, the bearings supporting the hub 17 of wheel 18, on the sleeve 11, and said bearings being spaced apart by means of an inwardly extending rib 19 formed in the hub 17. The inner bearing member abuts the shoulder 15' formed by the reduced end of sleeve 11, and the outer bearing member abuts the lock nut 20 engaging the threaded end 21 of the sleeve. This manner of securing the bearing members 16 on the portion 15 of the sleeve also retains the wheel 18 in position, as will be readily understood by those skilled in the art to which an invention of this type appertains.

The axle 9 is free to rotate in sleeve 11, and has secured to its squared end 10 a cap 22 having cruciform locking lugs 23 formed on its peripheral edge and adapted for engagement in the cruciform recesses 24 of the hub 17, said recesses being located in the outer portion of the hub. The lugs 23 of member 22 are held in engagement with the recesses 24 by means of a hub cap 25 detachably secured to the hub 17.

To reinforce the housing 6 and to take up a portion of the stress thus applied to the housing by the construction hereinbefore described, a supplemental reinforcing casing is provided, comprising a pair of substantially longitudinally channeled plates 26 shaped to conform to the housing 6 and secured to the opposite sides thereof by means of clip members 27 which are of well known construction.

From the foregoing description taken in connection with the drawing, it will be obvious that direct bearing support on the rear axle is eliminated, and the free retention of the driving axle is provided, in that the casing 6 is substantially reinforced to bear the extra stress placed thereon.

What we claim as our invention is:

1. In a vehicle, the combination with a drive shaft housing and a drive shaft disposed therein and having one end extending beyond the end of the housing, of a sleeve surrounding a part of the projecting end of the shaft and partly located within the adjacent end of the housing, said sleeve being provided medially of its ends and adjacent the housing with an annular rib, said annular rib abutting the adjacent housing end to limit the telescoping of said sleeve with the housing, a wheel journaled on the portion of the sleeve exteriorly of said annular rib, and means drivingly connecting said drive shaft and wheel.

2. In a vehicle, the combination with a drive shaft housing provided with a stop member spaced from the end thereon and a drive shaft disposed therein and having one end extending beyond the end of the housing, of a sleeve surrounding a part of the projecting end of the shaft and partly located within the adjacent end of the housing, said sleeve being provided medially of its end and adjacent the housing with an annular rib, said annular rib abutting the adjacent housing to limit the telescoping of said sleeve with the housing, a wheel journaled on the portion of the sleeve exteriorly of said annular rib, and means drivingly connecting said drive shaft and wheel.

3. In a vehicle, the combination with a drive shaft housing and a drive shaft disposed therein and having one end extending beyond the end of the housing, of a sleeve surrounding a part of the projecting end of the shaft and partly located within the adjacent end of the housing and secured thereto, the portion of said sleeve which is projected outwardly of said housing being reduced to provide a shoulder thereon, a wheel including a hub having an interior inwardly extending rib disposed centrally with respect to the reduced end of said sleeve, a pair of bearing members on said reduced portion of the sleeve and engaging said hub to journally support the said wheel, said bearing members being spaced apart by the rib of said hub, the inner bearing member abutting the shoulder on said sleeve, and locking means engaging the outer end of said sleeve and abutting the outer face of the outer bearing member whereby to retain the wheel on said sleeve substantially as described.

4. In a vehicle, the combination with a drive shaft housing and a drive shaft disposed therein and having one end extending beyond the end of the housing, of a sleeve surrounding the projecting end of the axle and partly located within the adjacent end of the housing, a wheel journaled on the portion of the sleeve exteriorly of the housing, means for locking the wheel to the projected end of the shaft, and means for reinforcing said housing and extending from a point adjacent the termination of the end of the sleeve positioned in said housing.

In testimony whereof, we affix our signatures.

LOUIS A. HOTCHKISS.
PHILIP W. STOCUM.